United States Patent [19]

Feldinger

[11] Patent Number: 5,090,390
[45] Date of Patent: Feb. 25, 1992

[54] ELECTRONIC INJECTION SYSTEM FOR OTTO ENGINES

[75] Inventor: Martin Feldinger, Königstein, Fed. Rep. of Germany

[73] Assignee: VDO Adolf Schindling AG, Frantfurt am Main, Fed. Rep. of Germany

[21] Appl. No.: 655,736

[22] Filed: Feb. 14, 1991

[30] Foreign Application Priority Data

Apr. 30, 1990 [DE] Fed. Rep. of Germany ....... 4013849

[51] Int. Cl.$^5$ .................. F02D 9/08; F02D 33/02; F02D 41/18; F02D 41/14
[52] U.S. Cl. ............................ 123/494; 123/337; 123/478
[58] Field of Search ............. 123/437, 438, 439, 337, 123/478, 480, 494; 73/118.2, 861.42, 861.63; 364/510, 558

[56] References Cited

U.S. PATENT DOCUMENTS

| | | | |
|---|---|---|---|
| 4,112,879 | 9/1978 | Assenheimer et al. | 123/494 |
| 4,131,088 | 12/1978 | Reddy | 123/494 |
| 4,579,097 | 4/1986 | Yamamoto et al. | 123/439 X |
| 4,683,857 | 8/1987 | Yasuoka | 123/494 X |
| 4,750,464 | 6/1988 | Staerzl | 123/494 |
| 4,763,626 | 8/1988 | Staerzl | 123/438 |
| 4,903,649 | 2/1990 | Staerzl | 123/494 X |

FOREIGN PATENT DOCUMENTS 0035265 3/1983 Japan .................. 123/439

*Primary Examiner*—Willis R. Wolfe
*Attorney, Agent, or Firm*—Martin A. Farber

[57] ABSTRACT

An electronic injection system for Otto engines with injection nozzle (4) has a displaceable throttle body disposed in the intake air flow (2), and includes intake air mass measurement. In order to assure optimal measurement and dosaging of the mass flow of air at minimum structural expense and within a minimum space, particularly in the case of rapidly varying engine loads and speeds of rotation, the injection system has a convergent/divergent nozzle (12) with narrowest cross section adjustable by the nozzle body. The system includes a position indicator (18) for the throttle body, measurement devices for the pressure $p_O$ in front of the nozzle, and the pressure $p_L$ at the narrowest point of the nozzle and the air temperature $T_O$ in front of the nozzle. Also included is an electronic controller device (19) operative with at least the input variables $p_O$, $p_L$, $T_O$ and position (x) of the throttle body to provide an output variable opening time $t_O$ of the injection nozzle.

9 Claims, 4 Drawing Sheets

ELECTRONIC INJECTION SYSTEM FOR OTTO ENGINES

FIELD AND BACKGROUND OF THE INVENTION

The present invention relates to an electronic fuel injection system for otto engines with injection nozzle, adjustable throttle body disposed in a flow of intake air, and measurement of the mass of intake air.

In electronically regulated and controlled gasoline injection devices, the air ratio lambda is preadjusted in the manner that a corresponding mass flow of fuel is admixed with the mass flow of air. The closer the preadjustment of the air ratio approximates the value lambda=1, the less a lambda probe need enter into regulatory action in order to obtain the narrow "lambda window" necessary for optimal conversion of the noxious substances of the exhaust. This is particularly true in the case of rapidly varying engine loads and engine speeds of rotation.

In the known electronic injection systems, the flow of intake air is generally controlled by means of a throttle valve. For the metering of the fuel, the mass flow of air is determined by measurement devices such as measurement orifices or hot-wire probes. The control of the mass flow of air and the determination of the mass flow of air are thus effected by separate parts which, aside from the increased number of parts, results in a lack of sensitivity of response because the adjustment of the mass flow of fuel can take place only after the measurement of the mass of air. Aside from these basic disadvantages, the determination of the mass flow of air by a measurement orifice has the disadvantage of high mass inertia, large installation volume and high manufacturing costs. The measurement of the mass flow of air by a hot-wire air-quantity meter encounters difficulties due to the pulsating flow of air caused by the suction process of the fuel/air mixture via the cylinders. In addition to this, at certain speeds of rotation, resonance phenomena occur which can only be partially compensated for by engine-specific corrections.

SUMMARY OF THE INVENTION

It is an object of the present invention further to develop an electronic injection system of the above-indicated type in a manner providing reduced expense of manufacture and reduced space required, the system assuring optimum dosing and measuring of the mass flow of air, particularly upon rapidly varying engine loads and speeds of rotation.

According to the invention, there are provided a convergent-divergent nozzle (12) of which the narrowest cross section is adjustable by the throttle body (14), a position indicator (18) for the throttle body (14), measurement devices for the pressure $p_o$ in front of the nozzle (12), the pressure $p_L$ at the narrowest point of the nozzle (12) and the air temperature $T_o$ in front of the nozzle (12), as well as an electronic controller device (19) employing at least the input variables $p_o$, $p_L$, $T_o$ and position (x) of the throttle body (14) to provide the output variable, opening time $t_o$, of the injection nozzle (4).

Based on the development of the electronic injection system in accordance with the invention, the function of the air mass control as well as of the air mass measurement is associated, directly or indirectly, with the throttle body. The functions of the electronic injection system are carried out exclusively in accordance with physical circumstances and not in accordance with an expensive engine performance diagram which is recorded. The basis is the recognition of the fact that, in the event of steady isentropic flow, the mass flow of air is determined by the foregoing variables $p_o$, $p_L$ and $T_o$, and by the cross section of the nozzle at the narrowest cross section, and that the velocity of flow of the intake air over a wide operating range of the engine corresponds to the speed of sound. The nozzle cross section is set by the position of the throttle body. As long as the pressure $p_L$ is less than a "critical" value, there is no change in the velocity of flow or in the condition of the air in the narrowest cross section of the nozzle. This means that the mass flow of air—with invariable position of the throttle member—remains constant. If the engine load increases, starting from the "critical state of flow" in the narrowest cross section of the nozzle, then finally, upon the exceeding of a given air pressure pL, the transition from "critical flow" with "sonic speed" to a "hypocritical flow" with "subsonic speed" takes place. With unchanged position of the throttle member, the mass flow of air drawn in by the engine thus becomes smaller.

On this basis, in order to measure the mass flow of air, it is sufficient to determine the variables $p_o$, $p_L$, $T_o$ and the position of the throttle body. The variables are fed to the electronic controller device, which converts them into the output variable of the opening time $t_o$ of the injection nozzle, the opening time being based on the injection characteristic of the injection nozzle. It is obvious that, instead of one injection nozzle, a plurality of injection nozzles corresponding in particular to the number of cylinders can, of course, also be provided, in which case the mass flow of fuel of the injection nozzles is to be placed in relationship to the opening time of the injection nozzles. The invention is not limited to inputting solely the foregoing physical variables of the electronic device, but includes other suitable input variables such as, for instance, the speed of rotation of the engine, the lambda value determined at the time, characteristics concerning idling, hot operation and acceleration, which can be made to affect the opening time via the electronic device.

According to a feature of the invention, the speed of rotation n of the Otto engine and the air ratio lambda are introduced as further input variables into the electronic device (19).

According to one advantageous embodiment of the invention, a rigid setting element (15) is connected to the throttle body (14), with which element on its part a pedal cable of a gas pedal is connected in movement. There is thus also definitely the possibility of displacing the throttle body or the setting element by means of a setting motor which is controlled electrically from the gas pedal. The movement of the throttle body is advantageously represented by a wiper which is connected to the setting element and in its turn cooperates with a potentiometer of the position indicator. The position of the throttle body can, aside from this, be defined by any other suitable element.

According to another feature of the invention, a wiper (17) connected to the setting element (15) forms a part of the potentiometer of the position indicator (18).

Still further according to the invention, the throttle body (14) is developed as throttle cone, and the diffuser (13) of the nozzle (12) is straight.

In accordance with a particular embodiment of the invention, the throttle body (14) is developed as a throttle plate and the diffuser of the nozzle (12) is developed as a radial diffuser (22). In this way, it is possible to effect the throttling and measuring of the mass flow of air with a low structural height of the associated parts. With such a development, the radial diffuser (22) could also be surrounded by an air filter (25) so that the oncoming air enters, after filtration, inwards into the radial diffuser and discharges outwards. Another embodiment of the invention provides that the throttle body is developed as throttle cone and the diffuser of the nozzle is straight.

BRIEF DESCRIPTION OF THE DRAWING

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
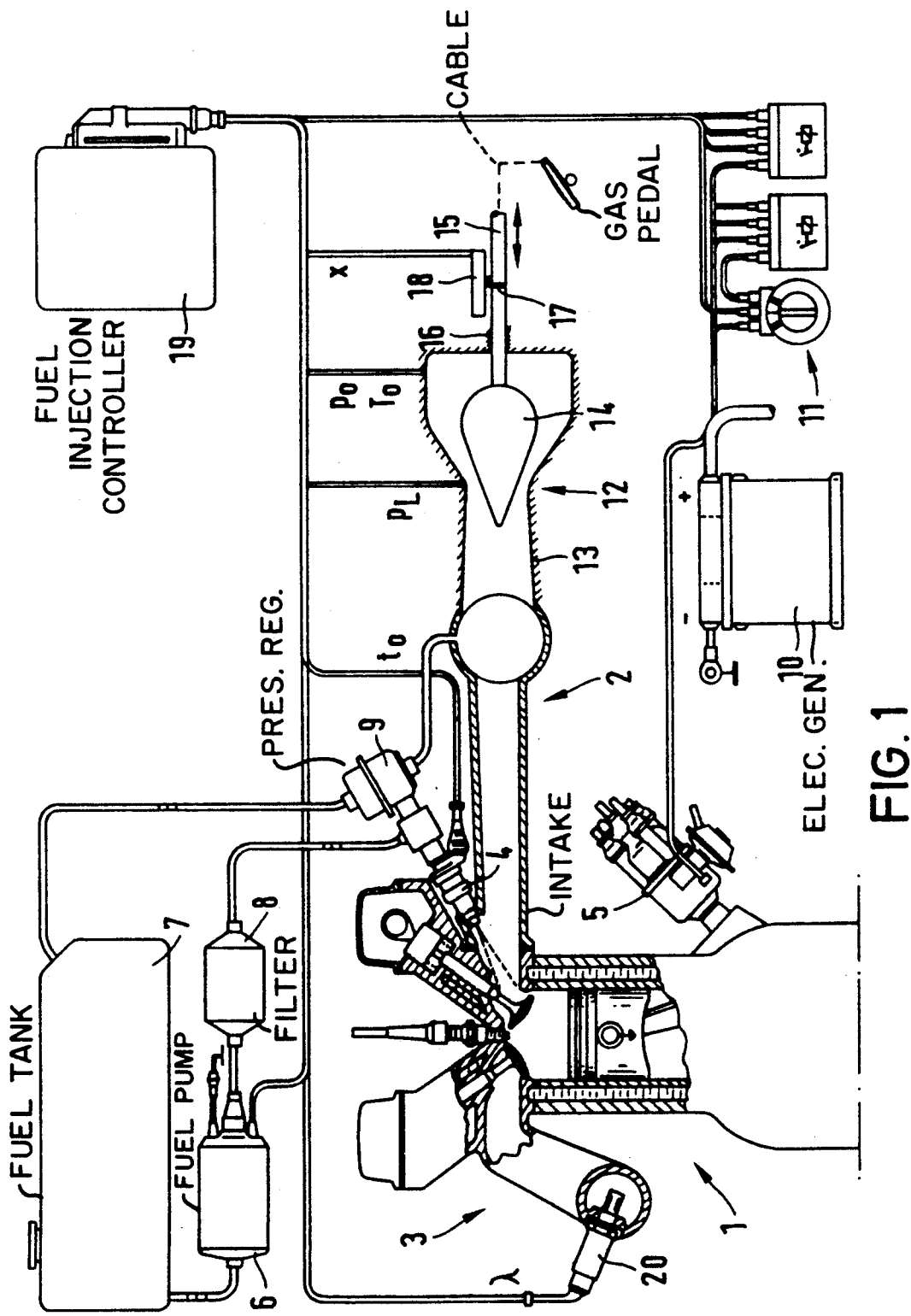
FIG. 1 is a diagram of the electronic injection system of the invention with a first embodiment of the throttle body which is arranged in the intake air flow.

FIG. 1 shows an Otto engine 1 with intake pipe 2 and exhaust pipe 3, injection nozzle 4 and distributor 5. An electric fuel pump 6 pumps fuel out of a fuel tank 7 through a fuel filter 8 to the injection nozzle 4. A fuel pressure regulator 9 cooperates with the injection nozzle 4 and is connected with the fuel tank 7 and the intake pipe 2. Electric energy is introduced into the system via a generator 10; 11 is an ignition switch.

Intake air is fed to the intake pipe 2 via a convergent/divergent nozzle 12 with linear diffuser 13, within which nozzle a throttle body 14 in the form of a throttle cone is longitudinally displaceable, whereby the narrowest cross section of the nozzle 12 can be adjusted. On the intake side, a rigid setting element 15 is fastened to the throttle body 14 symmetrical to it, the setting element 15 being axially displaceable in bearings 16 and connected, locked for movement, with a gas pedal. To the setting element 15 there is furthermore connected a wiper 17 which operates as part of a potentiometer of a position indicator 18.

The electric fuel pump 6, the injection nozzle 4, the distributor 5 and a lambda probe 20 inserted in the exhaust pipe 3 are connected electrically to an electronic device 19, or controller, which regulates and controls the electronic fuel injection system. The pressure $p_o$ and the air temperature $T_o$ in front of the nozzle, as well as the pressure $p_L$ at the narrowest point of the nozzle, are furthermore determined by suitable well-known measuring devices. The variables $p_L$, $p_o$, $T_o$, as well as the position x of the throttle body 14, verified by the potentiometer 18, are fed electrically to the electronic device 19 as input variables. Due to the physical law described above, the electronic device 19, on basis of these variables, calculates the mass flow of air and, with respect to the injection nozzle 4 which injects the fuel, the opening time $t_o$ of the nozzle in order to obtain an optimal composition of the fuel-air mixture.

Figure 2:
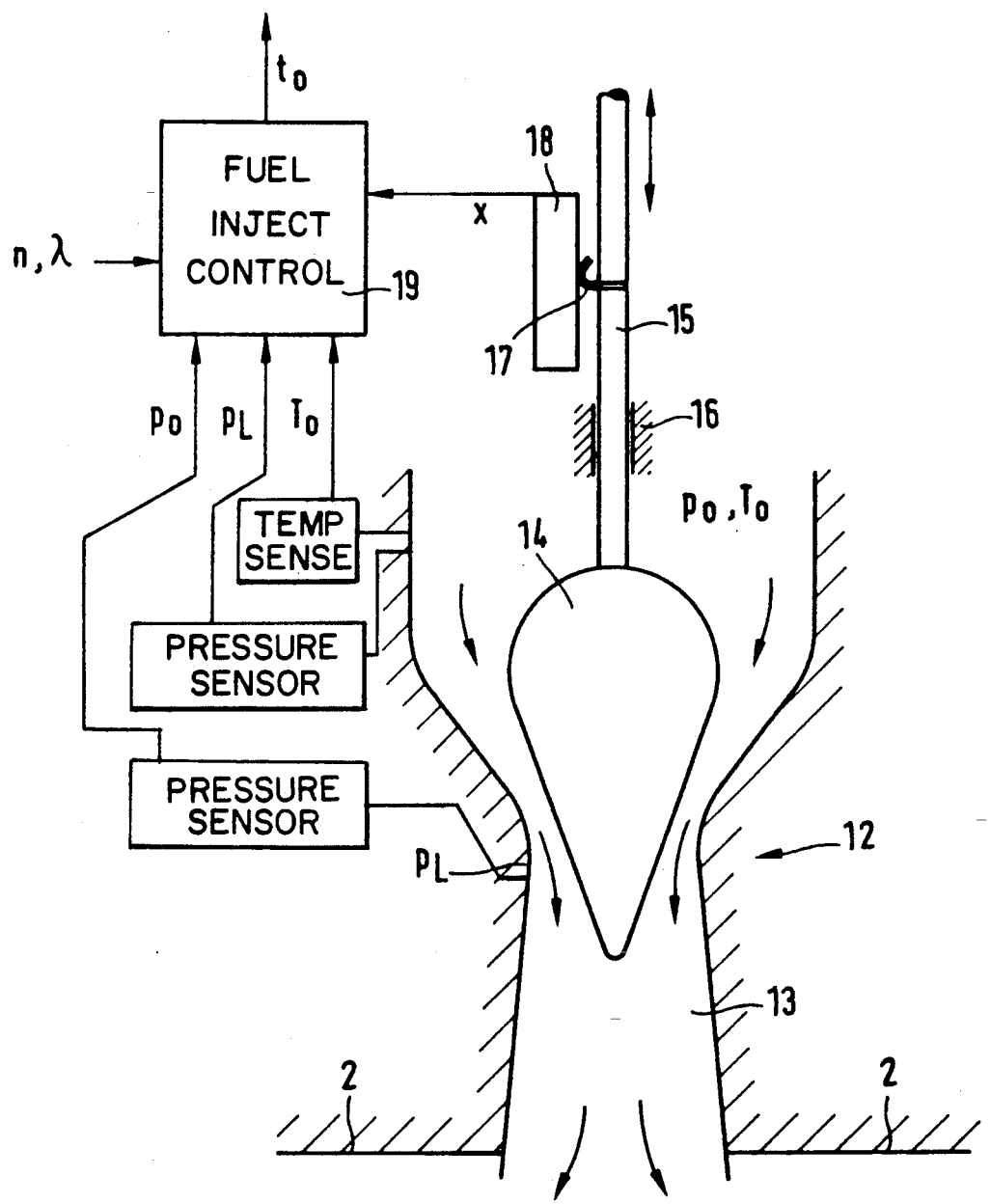
FIG. 2 is the embodiment of the throttle body shown in FIG. 1 with corresponding nozzle body and showing the input and output variables for the intake air mass measurement.

FIG. 2 shows, in a larger view, the conditions in the region of the throttle body 14 developed as throttle cone with intake pipe 2 connected to the straight diffuser 13. The figure furthermore shows the input and output variables of the electronic device 19, the input variables of speed of rotation n of the engine and composition λ (lambda) of the exhaust gas being also indicated there; in addition, other input variables such as, for instance, variables referring to idling, hot-running and acceleration, can be employed by the electronic system to provide the opening time $t_o$ of the injection nozzle 4.

Figure 3:
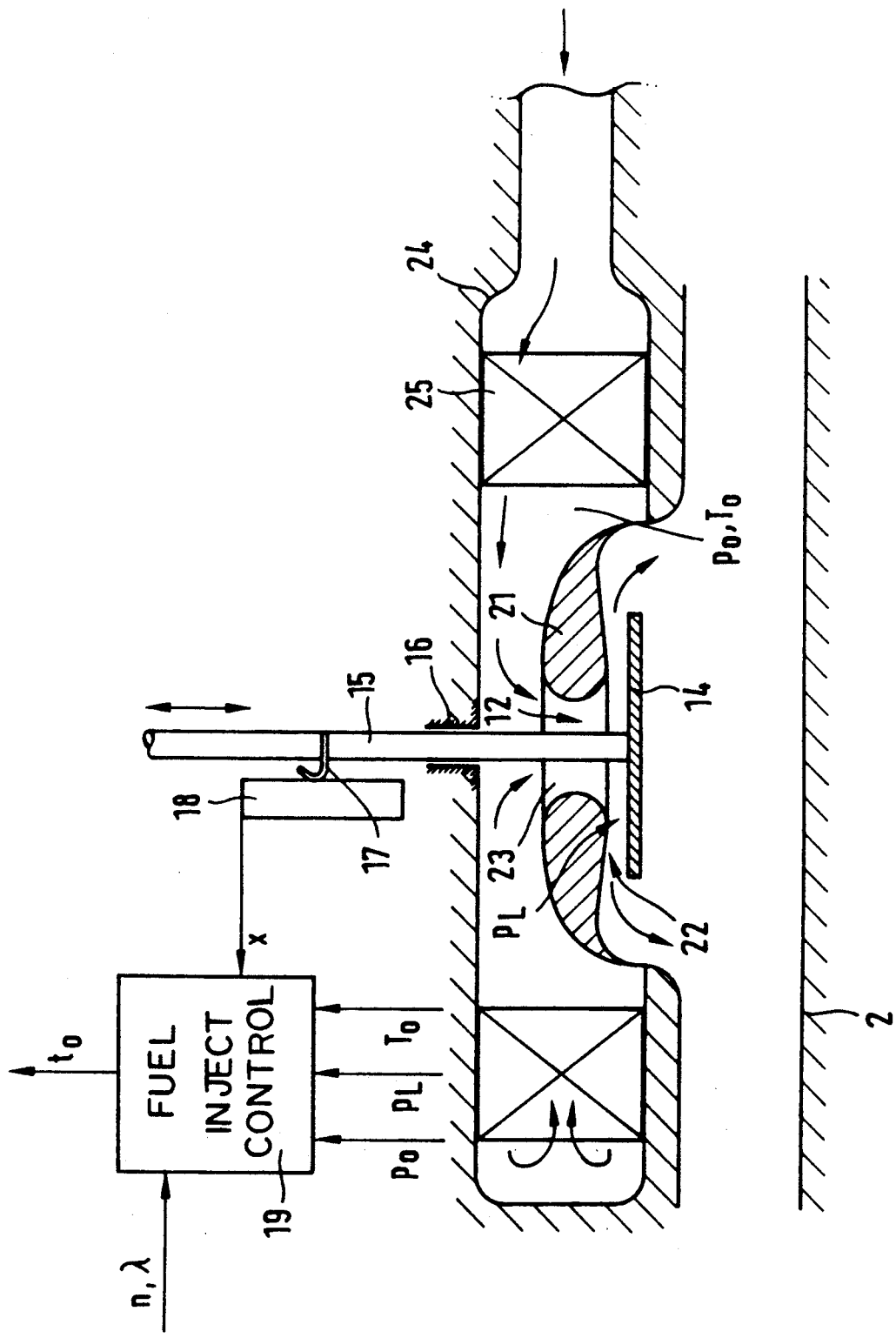
FIG. 3 is a showing corresponding to FIG. 2 for another embodiment of the throttle body.

In the embodiment shown in FIG. 3, the end of the setting element 15 facing the intake pipe 2 receives a throttle body 14 developed as a throttle plate, the throttle body, together with a nozzle body 21, also forming a convergent/divergent nozzle 12 which, however, debouches into a radial diffuser 22 rather than into a straight diffuser. In detail, the setting element 15 passes through the nozzle-body opening 23; and the throttle body 14 connected to the setting element 15, together with the nozzle body 21, forms the radial diffuser 22. The convergent/divergent nozzle 12 surrounds an ordinary flat air filter 25 arranged in an air-filter housing 24 so that the air drawn in flows radially through the air filter 25 and the nozzle 12 into the intake pipe 2, and in this connection, is throttled by the throttle body 14 to a greater or lesser extent, depending on the position of the latter. Behind the air filter 25 and in front of the nozzle 12 the variables $T_o$ and $p_o$ are detected.

Figure 4:
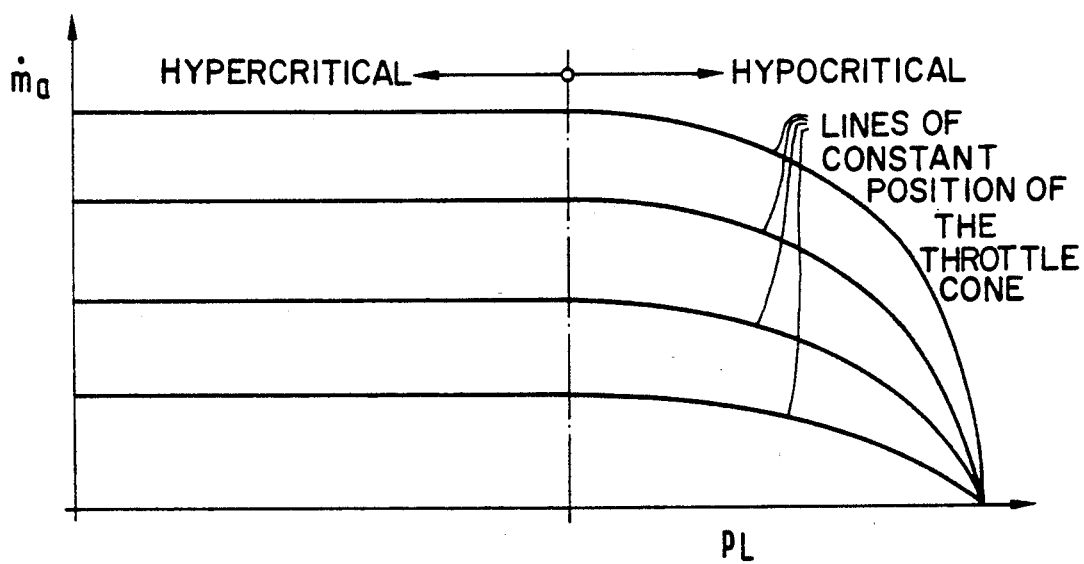
FIG. 4 is a graph showing the dependence of the mass flow of air and pressure at the narrowest point of the convergent/divergent nozzle formed between throttle body and nozzle body under hypercritical and hypocritical conditions.

FIG. 4 shows the relationships between the pressure $p_L$ at the narrowest point of the nozzle 12 and the mass flow of air $m_a$ passed through the nozzle which form the basis of the operation of the electronic injection system described. The showing is based on a determination of the mass flow of air with steady isentropic flow which, under the assumption that $p_o$ and $T_o$ are constant, depends exclusively on $p_L$. Based on recognition of the fact that the velocity of flow of the air drawn in amounts to sonic speed in the narrowest cross section of the nozzle for a wide range of operation of the engine, it follows that as long as the pressure of the air in the suction pipe is less than a "critical" value, there is no change in the velocity of flow or in the state of the air in the narrowest cross section of the nozzle. Accordingly, the mass flow of air—for an invariable position of the throttle body—remains constant. If, starting from the "critical state of flow" in the narrowest cross section of the nozzle, the engine load is increased, then finally, upon exceeding a given air pressure $p_L$, transition takes place into a hypocritical flow, whereby, with unchanged position of the throttle body, the mass flow of air drawn in by the engine becomes smaller. By means of the variables $p_L$, $p_o$ and $T_o$ and by determination of the path x of the throttle body, there can thus also be represented, by the determination of the mass flow of air, the opening time $t_o$ of the injection nozzle for optimal preadjustment of the air ratio. The closer this preadjustment of the air ratio is to the value lambda = 1, the less the lambda probe need act on the electronic device 19 in order to achieve the narrow lambda window necessary for optimum conversion of the noxious substances in the exhaust gas.

I claim:

1. An electronic fuel injection system for otto engines comprising:
    an injection nozzle, an adjustable throttle body arranged in a flow of intake air, and means for measuring of the mass of intake;
    a throttle body, and a convergent-divergent nozzle of which a narrowest cross section is adjustable by the throttle body;
    a position indicator for indicating position of the throttle body, said measuring means indicating measurement devices of the pressure $p_o$ in front of the nozzle, the pressure $p_L$ at the narrowest point of the nozzle and the air temperature $T_o$ in front of the nozzle; and
    an electronic controller operative in response to device at least the input variables $p_o$, $p_L$, $T_o$ and position (x) of the throttle body to provide an output variable, opening time $t_o$, of said injection nozzle.

2. A system according to claim 1, wherein the speed of rotation n of the Otto engine and the air ratio lambda are introduced as further input variables into the electronic controller device.

3. A system according to claim 2, further comprising:
a rigid setting element connected to the throttle body, and a pedal cable of a gas pedal connected to the setting element for movement of the setting.

4. A system according to claim 1, further comprising:
a rigid setting element connected to the throttle body, and a pedal cable of a gas pedal connected to the setting element for movement of the setting.

5. A system according to claim 3, wherein:
said position indicator includes a potentiometer having a wiper connected to the setting element.

6. A system according to claim 1, wherein:
the throttle body is developed as a throttle cone and the nozzle has a diffuser which is straight.

7. A system according to claim 1, wherein:
the throttle body is developed as throttle plate and said nozzle includes a radial diffuser.

8. A system according to claim 7, wherein:
the radial diffuser is configured to receive an encircling air filter to allow incoming air to enter, after filtration by the filter, inwards into the radial diffuser and to discharge outwards from the diffuser.

9. A system according to claim 1, wherein:
the throttle body is developed as a throttle cone and the nozzle has a straight diffuser.

* * * * *